(12) United States Patent
Miyahara et al.

(10) Patent No.: US 10,066,720 B2
(45) Date of Patent: Sep. 4, 2018

(54) TORSIONAL VIBRATION REDUCTION DEVICE

(71) Applicant: TOYOTA JIDOSHA KABUSHIKI KAISHA, Toyota-shi, Aichi-ken (JP)

(72) Inventors: Yu Miyahara, Susono (JP); Fusahiro Tsukano, Susono (JP); Atsushi Honda, Seto (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/320,625

(22) PCT Filed: Jun. 22, 2015

(86) PCT No.: PCT/IB2015/001007
§ 371 (c)(1),
(2) Date: Dec. 20, 2016

(87) PCT Pub. No.: WO2015/198120
PCT Pub. Date: Dec. 30, 2015

(65) Prior Publication Data
US 2017/0159786 A1    Jun. 8, 2017

(30) Foreign Application Priority Data
Jun. 25, 2014    (JP) .................................. 2014-129775

(51) Int. Cl.
*F16H 45/02*    (2006.01)
*F16F 15/14*    (2006.01)

(52) U.S. Cl.
CPC ........... *F16H 45/02* (2013.01); *F16F 15/145* (2013.01); *F16H 2045/0226* (2013.01); *F16H 2045/0263* (2013.01)

(58) Field of Classification Search
CPC ............ F16H 45/02; F16H 2045/0226; F16H 2045/0263; F16F 15/145; F16F 15/1407; F16F 15/14; F16F 15/167
See application file for complete search history.

(56) References Cited

U.S. PATENT DOCUMENTS

| | | | |
|---|---|---|---|
| 5,513,731 A * | 5/1996 | Matsuoka | F16H 45/02 192/208 |
| 6,280,330 B1 * | 8/2001 | Eckel | F16F 15/13142 464/3 |

(Continued)

FOREIGN PATENT DOCUMENTS

| | | |
|---|---|---|
| JP | 2012-197886 A | 10/2012 |
| JP | 2013-044370 A | 3/2013 |

(Continued)

*Primary Examiner* — Richard M Lorence
*Assistant Examiner* — Lori Wu
(74) *Attorney, Agent, or Firm* — Hunton Andrews Kurth LLP

(57) ABSTRACT

A torsional vibration reduction device that is provided inside of a fluid power transmitting device that has a driving side member that generates a fluid flow, and a driven side member that is driven by the fluid flow, includes a rolling element configured to move in a reciprocating manner according to a variation in torque; a retaining member that has a rolling chamber configured to house the rolling element in a manner that enables the rolling element to move in a reciprocating manner; and a housing configured to shield the rolling element and the rolling chamber from fluid inside of the fluid power transmitting device. The retaining member is enclosed and fixed inside the housing, and the housing is fixed to the driven side member.

12 Claims, 9 Drawing Sheets

(56) References Cited

U.S. PATENT DOCUMENTS

| | | | | |
|---|---|---|---|---|
| 6,345,552 | B1* | 2/2002 | Rohrig | F16F 15/1435 74/574.4 |
| 6,382,050 | B1* | 5/2002 | Carlson | F16F 15/145 464/24 |
| 2012/0080280 | A1* | 4/2012 | Takikawa | F16H 45/02 192/3.28 |
| 2012/0080281 | A1* | 4/2012 | Takikawa | F16H 45/02 192/3.28 |
| 2012/0080282 | A1* | 4/2012 | Takikawa | F16H 45/02 192/3.28 |
| 2013/0116054 | A1* | 5/2013 | Amano | F16D 7/027 464/45 |
| 2014/0066216 | A1* | 3/2014 | Tone | F16D 3/12 464/160 |
| 2014/0221105 | A1* | 8/2014 | Jimbo | F16F 15/1397 464/45 |
| 2014/0374207 | A1 | 12/2014 | Amano | |
| 2015/0005078 | A1 | 1/2015 | Sekiguchi et al. | |
| 2015/0369334 | A1* | 12/2015 | Dinger | F16F 15/145 74/574.2 |
| 2016/0169358 | A1* | 6/2016 | Kawahara | F16F 15/1421 192/3.28 |
| 2016/0281830 | A1 | 9/2016 | Sekiguchi | |

FOREIGN PATENT DOCUMENTS

| | | |
|---|---|---|
| JP | 2015-102115 A | 6/2015 |
| WO | 2013/128590 A1 | 9/2013 |
| WO | 2013/161058 A1 | 10/2013 |
| WO | 2015/076119 A1 | 5/2015 |

\* cited by examiner

TORSIONAL VIBRATION REDUCTION DEVICE

CROSS-REFERENCE TO RELATED APPLICATIONS

This is a national phase application based on the PCT International Patent Application No. PCT/IB2015/001007 filed Jun. 22, 2015, claiming priority to Japanese Patent Application No. 2014-129775 filed Jun. 25, 2014, the entire contents of both of which are incorporated herein by reference.

BACKGROUND OF THE INVENTION

1. Field of the Invention

The invention relates to a device that reduces torsional vibration due to reciprocating motion or pendulum motion of an inertial mass.

2. Description of Related Art

Examples of this kind of device are described in International Publication No. WO 2013/161058, International Publication No. WO 2013/128590, and Japanese Patent Application Publication No. 2013-44370 (JP 2013-44370 A). In these devices, inertial mass is configured as a rolling element, and this rolling element is housed in a rolling chamber formed in a rotating body. These devices are configured to reduce torsional vibration when it is generated in the rotating body, by the rotating body moving inside the rolling chamber in a reciprocating manner according to the torsional vibration. Each of these devices is arranged inside of a torque converter. With the structures described in International Publication No. WO 2013/161058 and International Publication No. WO 2013/128590 in particular, the rolling element and rolling surface are covered by a case member so that the reciprocating motion of the rolling body will not be impeded or affected by oil. A seal member is provided between this case member and the rotating body. As a result, a space formed by the case member is kept liquid-tight, and the case member and the rotating body are able to rotate relative to one another.

Also, with the structure described in International Publication No. WO 2013/128590, a torsional damper is arranged overlapping a torsional vibration reduction device in the axial direction and farther to the inside than the torsional vibration reduction device in the radial direction of the rotating body. In briefly describing the structure of the torsional damper, the case member described above is formed by a pair of plates, and these plates also serve as an input side member of the torsional damper. The rotating body becomes the output side member of the torsional damper, and this output side member is arranged between the pair of plates. Also, the plates and the rotating body are connected together, in a manner such that power is able to be transferred, via a spring. Furthermore, JP 2013-44370 A describes a torsional vibration reduction device formed with a rotating body fastened to a turbine shell of a turbine runner by a rivet.

With the structures described in International Publication No. WO 2013/161058 and International Publication No. WO 2013/128590, the space may also be sealed by welding a gap between the rotating body and the case member. However, in this case, if the material of which the rotating body is formed is different from the material of which the case member is formed, welding between these materials may be difficult.

With the structure described in JP 2013-44370 A, because the rotating body and the turbine shell are fastened together by a rivet, a rivet that is longer by an amount corresponding to the thickness of the rotating body is used. That is, the reliability of the joint of these members may decrease as the length of the rivet increases.

SUMMARY OF THE INVENTION

The invention thus provides a torsional vibration reduction device that is able to be reliably attached and is able to ensure the sealability of a housing that covers a rolling element and a rolling chamber by a simple structure.

Thus, a first aspect of the invention relates to a torsional vibration reduction device to be provided inside of a fluid power transmitting device that has a driving side member configured to generate a fluid flow, and a driven side member driven by the fluid flow. This torsional vibration reduction device includes a rolling element, a retaining member, and a housing. The rolling element is configured to move in a reciprocating manner according to a variation in torque inputted in the rolling element. The retaining member has a rolling chamber configured to house the rolling element in a manner that enables the rolling element to move in the reciprocating manner. The housing fixes and encloses the retaining member therein, and the housing is fixed to the driven side member. The housing is configured to shield the rolling element and the rolling chamber from fluid inside of the fluid power transmitting device.

Also, in the torsional vibration reduction device described above, the housing may have an annular recessed portion and a lid. The annular recessed portion may have both an annular shape and a shape that is open to the driven side member side. The lid may have a shape that covers an open end portion of the annular recessed portion. The fluid power transmitting device may have an elastic damper inside the fluid power transmitting device. The elastic damper may be configured to connect, in a manner that enables power to be transmitted, an input side plate and an output side plate via an elastic body, the input side plate and the output side plate being provided inside the fluid power transmitting device. Also, the housing and the elastic damper may be arranged lined up in an axial direction of the housing.

Also, in this torsional vibration reduction device, the fluid power transmitting device may have a lockup clutch that connects the driving side member to the driven side member. The housing, the elastic damper, and the lockup clutch may be arranged lined up in the axial direction.

Also, in the torsional vibration reduction device described above, the housing may have an annular recessed portion and a lid. The annular recessed portion may have both an annular shape and a shape that is open to the driven side member side. The lid may have a shape that covers an open end portion of the annular recessed portion. The fluid power transmitting device may have an elastic damper inside the fluid power transmitting device. The elastic damper may be configured to connect, in a manner that enables power to be transmitted, an input side plate and an output side plate that are provided inside the fluid power transmitting device, via an elastic body. The housing and the elastic damper may be arranged lined up in a radial direction of the housing, and overlapping each other in an axial direction.

Also, in the torsional vibration reduction device described above, the fluid power transmitting device may have a lockup clutch that connects the driving side member to the driven side member. The housing, the elastic damper, and the lockup clutch may be arranged lined up in the radial direction, and overlapping each other in the axial direction.

Also, in the torsional vibration reduction device described above, the retaining member may have an annular shape and includes a cutout portion on an outer peripheral portion of the retaining member. At least one of an annular recessed portion and the lid may include a protruding portion that engages with the cutout portion.

Also, in this torsional vibration reduction device, the retaining member may have a plurality of the rolling chambers, and the plurality of rolling chambers may be provided bilaterally symmetrical with a straight line that passes through a center portion in a circumferential direction of the retaining member and follows a radial direction of the retaining member as an axis of symmetry. Also, the rolling element may be configured to move in a reciprocating manner in a radial direction of the damper housing.

Also, in the torsional vibration reduction device described above, at least one of the annular recessed portion and the lid may be fixed to the driven side member.

According to the torsional vibration reduction device of the invention described above, the retaining member is enclosed and fixed inside the housing. That is, the retaining member is not exposed to outside of the housing, so openings and gaps in the housing are able to be directly closed up by, for example, welding together the members that form the housing. As a result, the housing is able to be reliably sealed, and this sealability is able to be improved. Also, because the housing is directly closed up, the number of parts is able to be reduced by that amount. Furthermore, the housing is designed to shield the rolling element from fluid inside the fluid power transmitting device, and is thus configured so as not to contact the rolling element. That is, the housing does not receive a load associated with reciprocating motion of the rolling element, and is thus able to be formed thinner than the retaining member. If this housing is fastened to the driven side member of the fluid power transmitting device by a rivet, the length of the rivet is able to be shorter than it is when the retaining member is fastened to the driven side member by a rivet. As a result, the fastening by the rivet is able to be more reliable, and reliability after fastening is able to be improved. Furthermore, the space of the connecting portion of the driven side member and the housing is able to be reduced.

Also, with the torsional vibration reduction device of the invention described above, the housing is formed by two members, i.e., the annular recessed portion and the lid. The lid need only be formed so as to block the opening of the annular recessed portion, so the number of machining hours is able to be reduced because the shape of the lid can be simpler, and consequently, machining costs can be kept down. Moreover, distortion in the lid following machining is able to be inhibited, so the housing is able to be assembled just as designed. Also, a space is formed to the inside of the annular recessed portion in the radial direction of the housing, and the elastic damper and lockup clutch and the like are able to be arranged in this space. Because space is able to be effectively utilized in this way, the axial length of the entire device is able to be shortened.

Furthermore, with the torsional vibration reduction device of the invention described above, the retaining member is positioned with respect to the housing by engaging the cutout portion formed on the outer peripheral portion of the retaining member with the protruding portion formed on the annular recessed portion or the lid. In this way, centering is able to be performed with a simple structure. Also, engagement portion is away from the rotational central axis of the retaining member and the housing and the like, so the load applied to the engagement portion is able to be reduced by that amount. That is, the retaining member and the housing are able to be reliably connected in a manner that enables torque to be transmitted, by a simple structure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
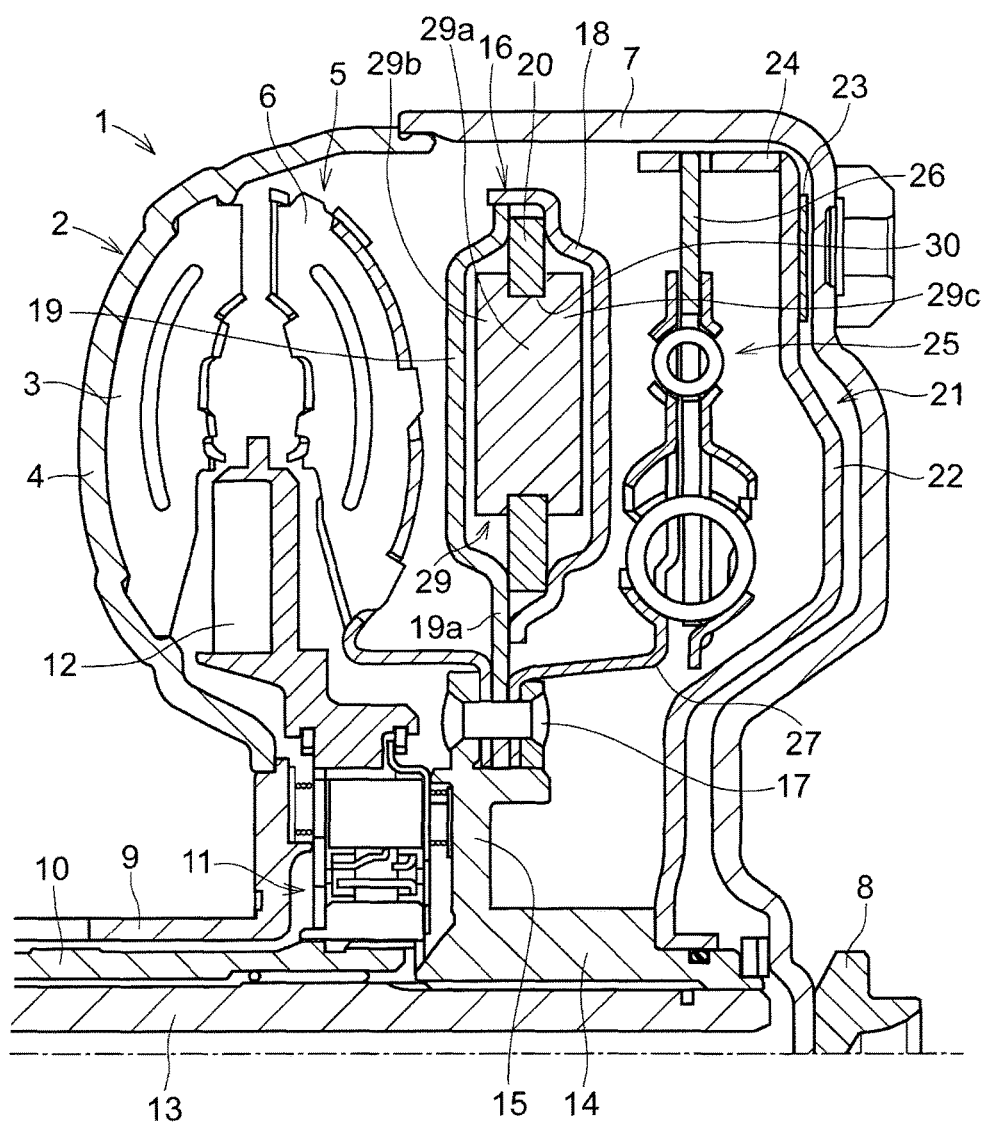
FIG. 1 is a view of one example in which a torsional vibration reduction device according to a first example embodiment of the invention is provided inside of a torque converter that is a fluid power transmitting device for multiplying torque.

In order to describe the invention in detail, first, a first example embodiment of the invention will be described. FIG. 1 is a view of an example in which a torsional vibration reduction device according to a first example embodiment of the invention is provided inside of a torque converter that is a fluid power transmitting device for multiplying torque. The basic structure of this torque converter 1 is similar to that of a conventionally-known torque converter. That is, a pump impeller 2 that is a driving side member that generates a fluid flow inside the fluid power transmitting device, and is a member on the input side, is formed having pump blades 3 that are arranged in an annular shape attached to an inside surface of a pump shell 4, and a turbine runner 5 that is arranged facing the pump impeller 2. This turbine runner 5 is driven by the fluid flow and has a shape that is substantially symmetrical with the pump impeller 2. The turbine runner 5 has multiple turbine blades 6 that are arranged in an annular shape fixed to the inside surface of a shell that has an annular shape. Therefore, the pump impeller 2 and the turbine runner 5 are arranged facing each other on the same axis.

A front cover 7 that covers an outer peripheral side of the turbine runner 5 is integrally joined with an outer peripheral end of the pump shell 4. This front cover 7 is a so-called closed-end cylindrical member that has a front wall surface that faces the inside surface of the pump shell 4, as shown in FIG. 1. A cylindrical member 8 is provided protruding from a center portion of the outside surface of the front wall. A crankshaft of an engine, not shown, is spigot fit to the cylindrical member 8. A drive plate, not shown, is attached to this crankshaft, and the drive plate and the front cover 7 are joined together by a nut and a bolt.

Also, a cylindrical shaft 9 is integrally provided on an inner peripheral end portion of the pump shell 4. This cylindrical shaft 9 extends from the back surface side of the pump shell 4, i.e., the side opposite the engine, and is connected to an oil pump, not shown. A fixed shaft 10 that has an outer diameter that is smaller than an inner diameter of the cylindrical shaft 9 is inserted inside the cylindrical shaft 9, and a tip end portion of this fixed shaft 10 extends to inside of the torque converter 1 that is covered by the pump shell 4 and the front cover 7. This fixed shaft 10 has a hollow shaft shape and is integrally formed with a fixed wall portion, not shown, that retains the oil pump. A space between the outer peripheral surface of this fixed shaft 10 and the inner peripheral surface of the cylindrical shaft 9 forms an oil passage.

The tip end portion of the fixed shaft 10 is positioned either on the inner peripheral side of the turbine runner 5, or on the inner peripheral side of a portion between the pump impeller 2 and the turbine runner 5. An inner race of a one-way clutch 11 is spline-engaged with the tip end portion of this fixed shaft 10. Also, a stator 12 that is arranged between the inner peripheral portion of the pump impeller 2 and the inner peripheral portion of the turbine runner 5 that faces the inner peripheral portion of the pump impeller 2, is attached to an outer race of this one-way clutch 11. An input shaft 13 of a transmission, not shown, is rotatably inserted into the inner peripheral side of the fixed shaft 10, and the tip end portion of the input shaft 13 protrudes from the tip end portion of the fixed shaft 10 and extends to near the inside surface of the front cover 7. A hub shaft 14 is spline-engaged with a tip end outer peripheral portion that protrudes from this fixed shaft 10. A flange-shaped hub 15 that protrudes toward the outer peripheral side is formed on this hub shaft 14. The turbine runner 5, a damper housing 16, and a torsion damper that will be described later, are integrally connected to the hub 15 by a rivet 17.

The damper housing 16 forms a portion of the torsional vibration reduction device of the invention, and includes an annular hollow portion, and a flange portion that connects this hollow portion to the hub shaft 14. This damper housing 16 is formed by an annular recessed portion 18 that is formed in an annular shape and is open to the turbine runner 5 side, i.e., protrudes toward the front cover 7 side, and a lid 19 formed so as to cover the opening of the annular recessed portion 18. In the first example embodiment illustrated here, this lid 19 is formed in a shape open toward the annular recessed portion 18, and having a depth measured in the axial direction that is shallower than the annular recessed portion 18. The hollow portion described above is formed by the lid 19 and the annular recessed portion 18, and the gap between contact portions of these is closed by welding, for example. A rolling element that will be described later is kept in a liquid-tight state, housed inside the hollow portion formed in this way. As a result, reciprocating movement of the rolling element is not impeded by hydraulic pressure inside the torque converter 1. Also, a portion of the lid 19 that is farther toward the inside than the hollow portion in the radial direction of the lid 19, is a flange portion 19a, and this flange portion 19a is fastened to the hub 15 by the rivet 17, as described above. The annular recessed portion 18 and the lid 19 do not contact the rolling element, and thus do not particularly receive a load associated with the rolling of the rolling element. Therefore, the annular recessed portion 18 and the lid 19 will not to deform or the like as easily as the retaining member that receives the load associated with the rolling of the rolling element, so the thickness of the annular recessed portion 18 and the lid 19 is formed thinner than that of a retaining member 20 that retains the rolling element in a manner that enables the rolling element to roll. Also, the annular recessed portion 18 and the lid 19 may be made of material having lower rigidity than the retaining member 20. The damper housing 16 described above is one example of a housing of the invention.

The retaining member 20 is enclosed and fixed inside the damper housing 16. This retaining member 20 is an annular member, and in the first example embodiment illustrated in FIG. 1, an outer peripheral portion and an inner peripheral portion in the radial direction of the retaining member 20 are sandwiched by the annular recessed portion 18 and the lid 19. The retaining member 20 is fixed sandwiched by the annular recessed portion 18 and the lid 19, by crimping the damper housing 16 having the structure described above in the axial direction, for example. The structure of this retaining member 20 will be described later.

A lockup clutch 21 is provided between the damper housing 16 and the front cover 7. This lockup clutch 21 includes a disc-shaped lockup piston 22, and this lockup piston 22 is engaged with the hub shaft 14. Also, a friction element (i.e., friction material) 23 that produces frictional force when pressed against the front cover 7 is attached to a side surface of the lockup piston 22 that faces the front cover 7. The lockup piston 22 is engaged (i.e., placed in an engaged state) and transmits torque between the front cover 7 and the hub shaft 14 by being pushed toward the right in FIG. 1 such that the friction element 23 contacts the front cover 7. That is, torque transmitted from the lockup clutch 21 is transmitted to the hub shaft 14 via a torsional damper 25. Also, the lockup piston 22 is disengaged (i.e., placed in a disengaged state) and interrupts the transmission of torque from the lockup clutch 21 to the hub shaft 14 by being pushed back to the left in FIG. 1 such that the friction element 23 moves away from the front cover 7.

Also, a cylindrical portion 24 that extends in the axial direction following the inner peripheral surface of the front cover 7, is formed on an outer peripheral end portion of the lockup piston 22. A drive plate 26 of the torsional damper 25 is connected, in a manner that enables power to be transmitted, to this cylindrical portion 24, and a driven plate 27 is fastened to the hub shaft 14 by the rivet 17. The principle structure of the torsional damper 25 is similar to that which is already known. The torsional damper 25 is one example of an elastic damper of the invention.

Figure 2:
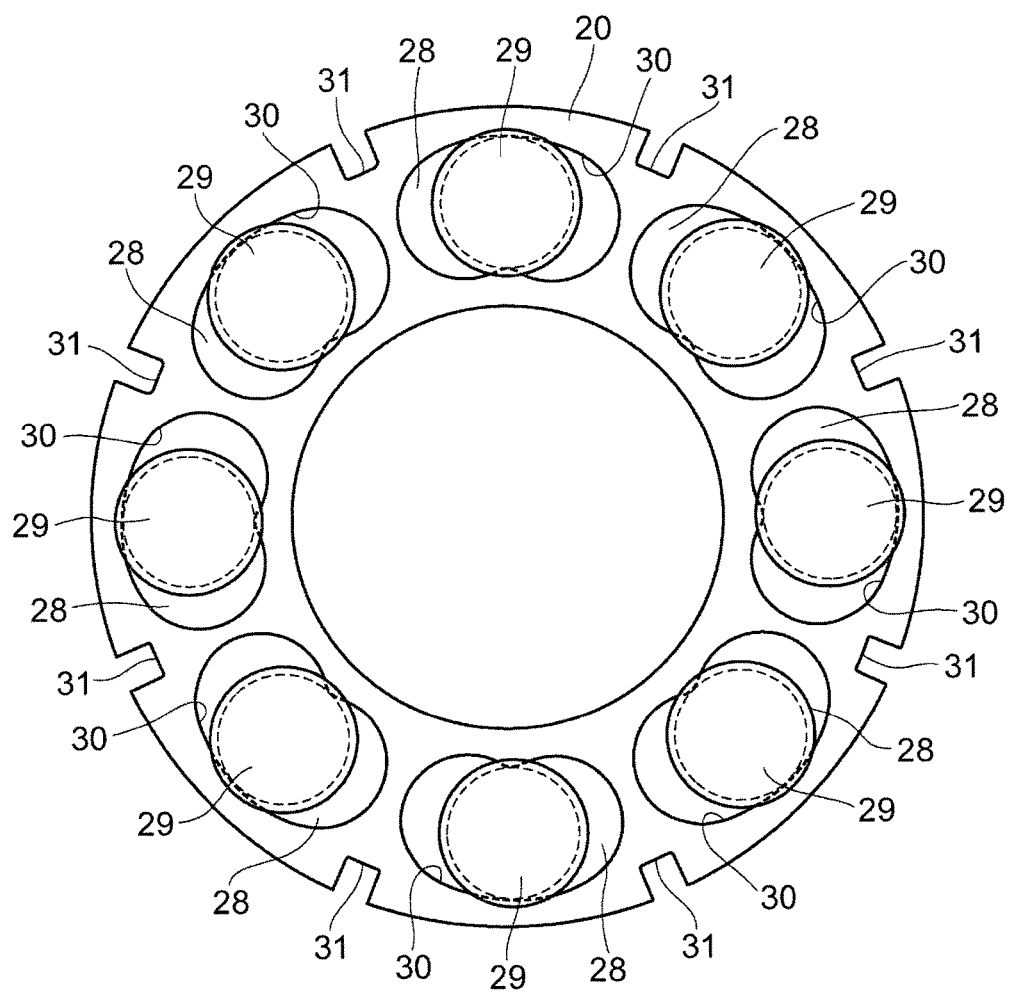
FIG. 2 is a front view of one example of a retaining member that forms a portion of the torsional vibration reduction device according to the first example embodiment.

FIG. 2 is a front view of one example of the retaining member that forms a portion of the torsional vibration reduction device of the invention. This retaining member 20 is an annular member as described above, with eight rolling chambers 28 formed at equidistant intervals. The structure of the retaining member 20 is not limited to this. For example, four rolling chambers 28 may be formed at equidistant intervals in the retaining member 20. These rolling chambers 28 are through-portions formed through the retaining member 20 in the thickness direction thereof, and are shaped curved in an arc shape, as shown in FIG. 2. In particular, in the first example embodiment illustrated here, each rolling chamber 28 is formed bilaterally symmetrical with a straight line that passes through the center portion of the rolling chamber 28 in the circumferential direction of the retaining member 20 and follows the radial direction of the retaining member 20 as the axis of symmetry. A rolling element 29 that moves in a reciprocating fashion by inertia force when the torque of the retaining member 20 fluctuates is housed in each rolling chamber 28. This rolling element 29 is pushed against the inside surface that is on the outside in the radial direction of the retaining member 20, of the inside surfaces of the rolling chamber 28, by centrifugal force when the retaining member 20 rotates, and rolls along this inside surface. Therefore, the inside surface becomes a rolling surface 30.

In the first example embodiment illustrated here, the rolling element 29 is formed by a circular cylindrical shaft portion 29a, and flange portions 29b and 29c that are integrally provided on both sides of the shaft portion 29a and have outer diameters that are larger than the outer diameter of the shaft portion 29a. The rolling element 29 may also be formed in a circular cylindrical shape. The shaft portion 29a is formed longer than the plate thickness of the retaining member 20, and the outer diameter thereof is formed smaller than the opening width of the rolling chamber 28 in the radial direction of the retaining member 20. An outer peripheral surface of this shaft portion 29a is a portion that contacts the rolling surface 30, and is pushed against the rolling surface 30 by centrifugal force. The outer diameters of the flange portions 29b and 29c are formed larger than the opening width of the rolling chamber 28. Therefore, inside wall surfaces of the flange portions 29b and 29c catch on the side surfaces of the retaining member 20, so the rolling element 29 will not come out of the rolling chamber 28.

Also, a cutout portion 31 is formed in an outer peripheral portion of the retaining member 20, between each rolling chamber 28. These cutout portions 31 are used to connect and position the retaining member 20 with respect to the damper housing 16, and center the retaining member 20. Therefore, a protruding portion 32 (see FIG. 3) that engages with the cutout portion 31 is formed on at least one of the annular recessed portion 18 and the lid 19. A pin may also be attached to an outer peripheral portion of the retaining member 20, and a recessed portion that this pin engages with may be formed on at least one of the annular recessed portion 18 and the lid 19, and the positioning and centering and the like may be performed by engaging this pin with the recessed portion.

Figure 3:
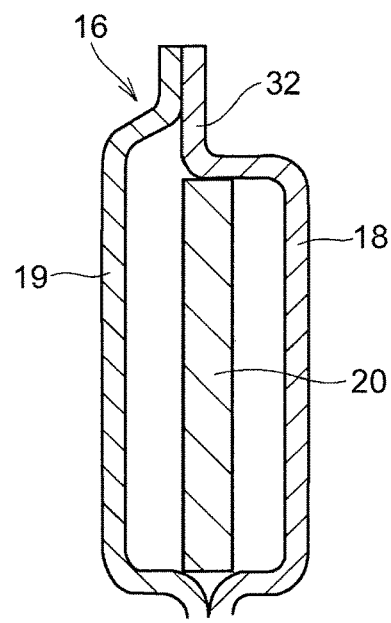
FIG. 3 is a sectional view of the torsional vibration reduction device cut along a plane in the radial direction of the retaining member, which passes through the center portion of a cutout portion in the circumferential direction of the retaining member.

FIG. 3 is a sectional view of the torsional vibration reduction device of the invention cut along a plane in the radial direction of the retaining member 20, which passes through the center portion of the cutout portion 31 in the circumferential direction of the retaining member 20. A portion of the annular recessed portion 18 that corresponds to the cutout portion 31 is depressed toward the lid 19 side, i.e., a protruding portion 32 that engages with the cutout portion 31 is formed, as shown in FIG. 3. On one hand, an outer peripheral portion of the lid 19 curves toward the annular recessed portion 18, and a tip end of this outer peripheral portion curves outward in the radial direction. Therefore, the outer peripheral portion of the lid 19 and the outer peripheral portion of the protruding portion 32 contact each other, as shown in FIG. 3. Also, outer peripheral edge portions of the contact portions of these are welded, not shown, for example, along the entire periphery of the damper housing 16. On the other hand, an inner peripheral portion of the annular recessed portion 18 curves toward the lid 19 side along the entire periphery, and the tip edge of this inner peripheral portion curves inward in the radial direction. Similar to this, an inner peripheral portion of the lid 19 also curves toward the annular recessed portion 18 side along the entire periphery. The inner peripheral portions of the annular recessed portion 18 and the lid 19 are made to contact each other, and edge portions of the contact portions of these are welded, not shown, along the entire periphery. Also, an inside surface on the inside in the radial direction, of the inside surfaces of the damper housing 16, are formed by curving inner peripheral portions of the annular recessed portion 18 and the lid 19 in this way, and this inside surface is made to contact the inner peripheral surface of the retaining member 20. That is, the retaining member 20 is connected, in a manner that enables power to be transmitted, to the damper housing 16, and positioned with respect thereto, by engaging the protruding portion 32 with the cutout portion 31, and bringing the inside surface on the inside in the radial direction of the damper housing 16 into contact with the inner peripheral surface of the retaining member 20. Also, consequently, the rotational central axis of the retaining member 20 and the rotational central axis of the crankshaft are aligned, i.e., centered.

Figure 4:
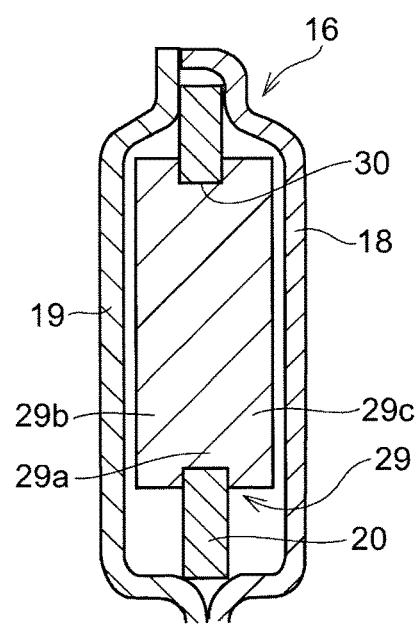
FIG. 4 is a sectional view of the torsional vibration reduction device cut along a plane in the radial direction of the retaining member, which passes through the center portion of a rolling chamber in the circumferential direction of the retaining member.

FIG. 4 is a sectional view of the torsional vibration reduction device cut along a plane in the radial direction of the retaining member 20, which passes through the center portion of the rolling chambers 28 in the circumferential direction of the retaining member 20. The outer peripheral portions of the 18 and the lid 19 are crimped in the axial direction so as to come close to each other. Therefore, both surfaces of the outer peripheral portion of the retaining member 20 are sandwiched between the annular recessed portion 18 and the lid 19. In this way, the retaining member 20 is fixed inside the damper housing 16. The inner peripheral surface of the retaining member 20 may also be contacting the inside surface in the radial direction of the damper housing 16, instead of the inner peripheral portion of the retaining member 20 being sandwiched between the annular recessed portion 18 and the lid 19, as shown in FIG. 4. Also, if the inner peripheral portion of the retaining member 20 is sandwiched between the annular recessed portion 18 and the lid 19 as shown in FIG. 1, the retaining member 20 is able to be more reliably fixed inside the damper housing 16, so the reliability of the device is able to be improved.

Therefore, according to the device having the structure described above, the retaining member 20 is enclosed and fixed inside the damper housing 16, so the contact portions of the annular recessed portion 18 and the lid 19 that are made of the same kind of material can be welded, and as a result, the damper housing 16 having high sealability is able to be obtained. Also, the annular recessed portion 18 and the lid 19 that form the damper housing 16 are directly welded together as described above, so the number of parts is able to be reduced accordingly. Furthermore, the retaining member 20 is connected to, and positioned and centered with respect to, the damper housing 16, by engaging the protruding portion 32 formed on the annular recessed portion 18 with the cutout portion 31. That is, positioning and centering are able to be performed with a simple structure, so assemblability of the torsional vibration reduction device of the invention is able to be improved. Also, the engagement portion described above is away from the rotational central axes of the retaining member 20 and the damper housing 16 and the like, so the load applied to the engagement portion is able to be reduced by a corresponding amount. Also, the lid 19 that is thin (i.e., that has a thin plate thickness), instead of the retaining member 20 that is thick (i.e., that has a thick plate thickness), is connected to the hub 15, so the axial length of the rivet 17 is able to be shorter by an amount corresponding to this difference in thickness. As a result, fastening by the rivet 17 is able to be reliably performed, so the reliability of this fastening is able to be improved.

Figure 5:
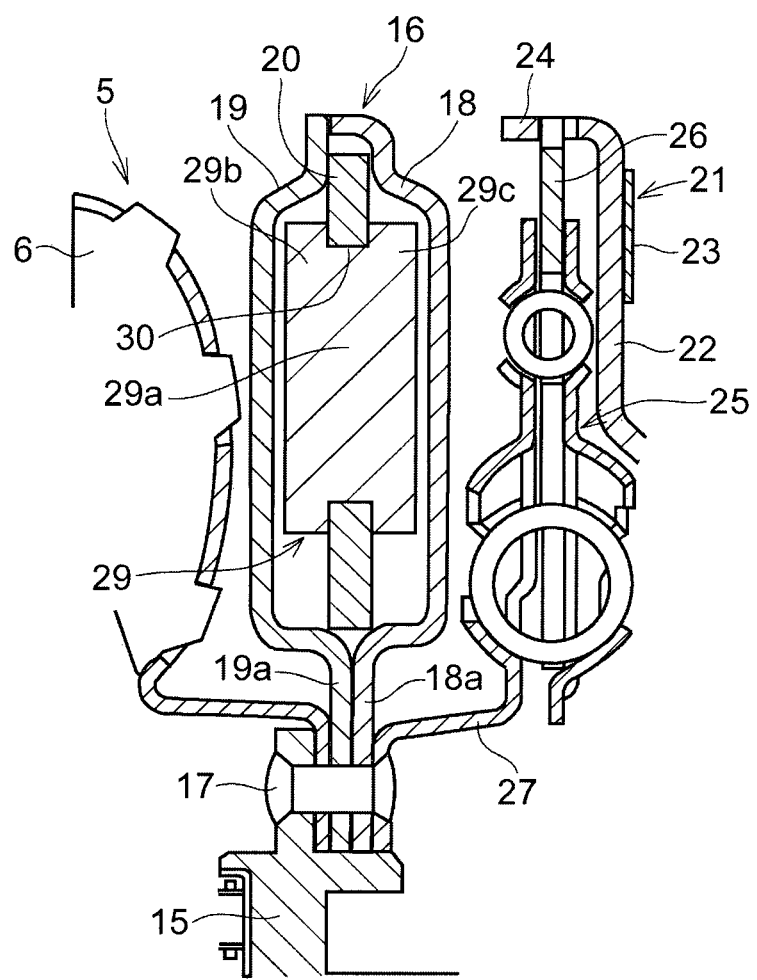
FIG. 5 is a sectional view of a torsional vibration reduction device according to a second example embodiment of the invention.

FIG. 5 is a sectional view of a torsional vibration reduction device according to a second example embodiment of the invention. In the second example embodiment illustrated here, the annular recessed portion 18 and the lid 19 that form the damper housing 16 are both connected to the hub 15 by the rivet 17. The inner peripheral portion of the annular recessed portion 18 extends inward in the radial direction thereof and becomes a flange portion 18*a*. The flange portion 18*a* is made to contact the flange portion 19*a* of the lid 19, and in this state, the two are fastened, together with the turbine runner 5 and the driven plate 27, to the hub 15 by the rivet 17. In the device having the structure shown in FIG. 5 as well, the retaining member 20 is enclosed and fixed inside of the damper housing 16, so the annular recessed portion 18 and the lid 19 are able to be attached by welding. With the structure shown in FIG. 5, the inner peripheral portions of the damper housing 16, i.e., the flange portions 18*a* and 19*a*, are fastened by the rivet 17, so the number of welding points described above is able to be reduced, and the damper housing 16 is able to be sealed by a simple structure. As a result, the number of machining hours is able to be reduced, and the device is able to be assembled easily.

Figure 6:
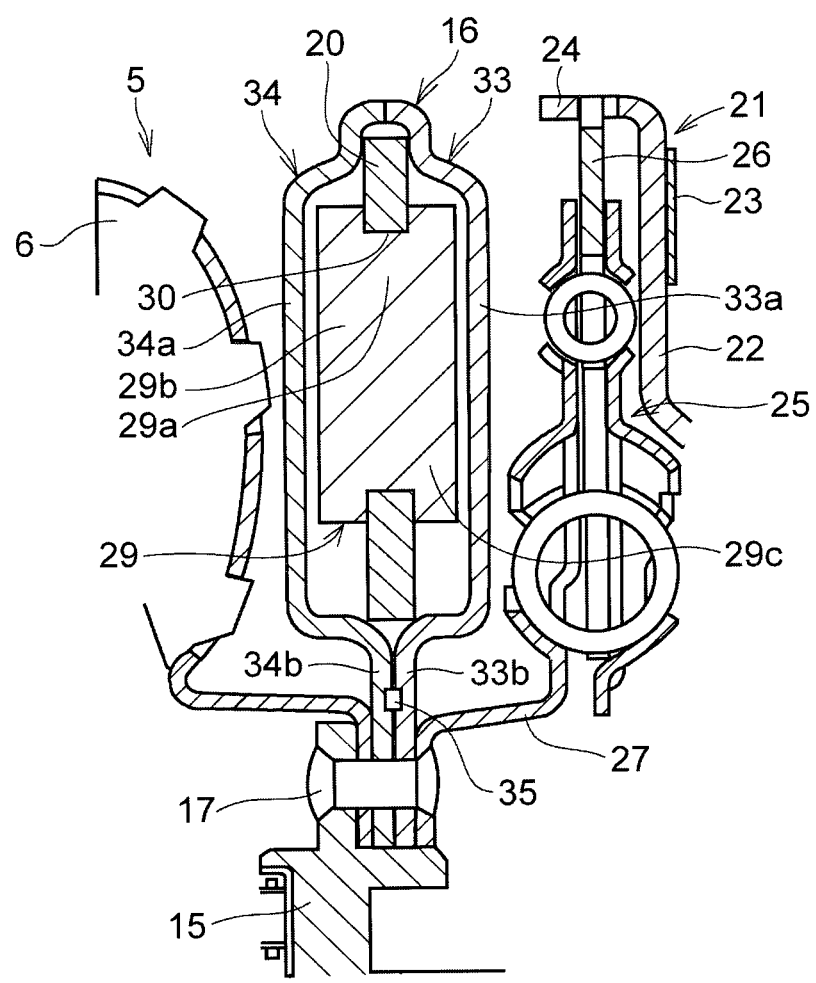
FIG. 6 is a sectional view of a torsional vibration reduction device according to a third example embodiment of the invention.

Also, FIG. 6 is a sectional view of a torsional vibration reduction device according to a third example embodiment of the invention. In the third example embodiment illustrated here, the damper housing 16 is formed by a pair of symmetrically-shaped plates 33 and 34. That is, these plates 33 and 34 include annular recessed portions 33*a* and 34*a* that are open in the axial direction, and flange portions 33*b* and 34*b* that are formed farther to the inside than the annular recessed portions 33*a* and 34*a*, in the radial direction of the plates 33 and 34. Also, open end portions of the annular recessed portions 33*a* and 34*a* contact each other, and outer peripheral edge portions thereof are welded together along the entire periphery. Also, the outer peripheral portions of the plates 33 and 34 are crimped in the axial direction so as to come close to one another, and as a result, the outer peripheral portion of the retaining member 20 is sandwiched between the plates 33 and 34. Consequently, the retaining member 20 is fixed inside the damper housing 16. Meanwhile, the flange portions 33*b* and 34*b* contact each other across a seal member 35 such as an O-ring, and portions farther to the inside than this seal member 35 are fastened to the hub 15 by the rivet 17.

In the device having the structure shown in FIG. 6 as well, the retaining member 20 is enclosed and fixed inside the damper housing 16, so the plates 33 and 34 are able to be welded. The welding point is only on the outer peripheral edge portions of the plates 33 and 34. The inner peripheral portions of the plates 33 and 34 are fastened by the rivet 17. Therefore, the sealability of the damper housing 16 is able to be ensured, while reducing the number of welding points.

Also, in particular, with the device having the structure shown in FIG. 6, the seal member 35 is provided, so the sealability of the damper housing 16 is able to be improved even though the number of parts increases.

Figure 7:
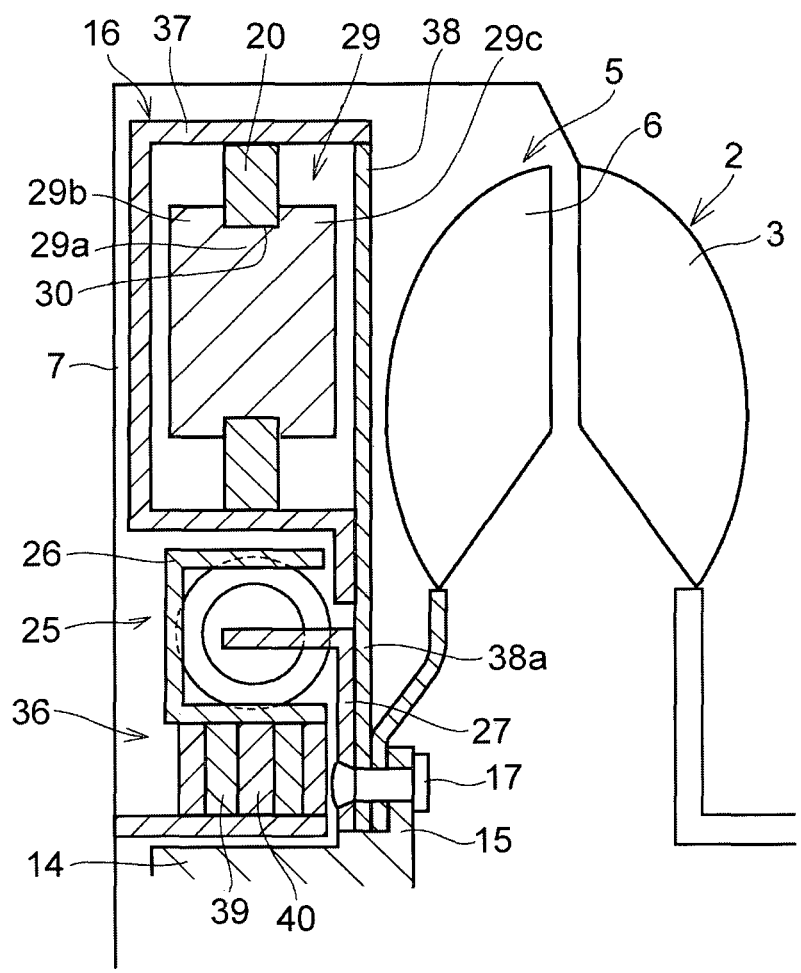
FIG. 7 is a sectional view of a torsional vibration reduction device according to a fourth example embodiment of the invention.

FIG. 7 is a sectional view of a torsional vibration reduction device according to a fourth example embodiment of the invention. In the fourth example embodiment illustrated here, the torsional damper 25 and a lockup clutch 36 are arranged to the inside in the radial direction of the damper housing 16. As shown in FIG. 7, the damper housing 16, the torsional damper 25, and the lockup clutch 36 are lined up in the radial direction, and are arranged overlapping in the axial direction. The damper housing 16 is formed by an annular recessed portion 37 that has a rectangular cross-section that is open on the turbine runner 5 side, and a disc-shaped lid 38 configured to cover the opening of this annular recessed portion 37. The retaining member 20 is integrally provided in the center portion of the annular recessed portion 37 in the axial direction. More particularly, although not shown, a cutout portion is formed in the outer peripheral portion of the retaining member 20, and a protruding portion that engages with this cutout portion is formed on the annular recessed portion 37 described above, similar to the torsional vibration reduction device according to the third example embodiment shown in FIGS. 1 to 6 described above. Then, the retaining member 20 is fixed, positioned, and centered in the damper housing 16 by the engagement of these. Also, the open end portion of the annular recessed portion 37 described above is covered by the lid 38, and the connecting portions of these members are welded together, not shown. As a result, the damper housing 16 is sealed with the liquid-tight state maintained. Also, the inner peripheral portion of the lid 38 is the so-called flange portion 38*a*, and this flange portion 38*a* is fastened, together with the turbine runner 5 and the torsional damper 25, to the hub 15 by the rivet 17.

Also, the multiple disc lockup clutch 36 is provided between the damper housing 16 and the hub shaft 14 in the radial direction. In brief, the multiple disc lockup clutch 36 includes a plurality of clutch discs 39 that are connected to the front cover 7, and a plurality of clutch plates 40 that engage with these clutch discs 39 via friction elements, not shown. The clutch plates 40 are configured to engage and transmit torque by being pushed to the left in FIG. 7 and contacting the clutch discs 39 via the friction elements. The clutch plates 40 are also configured to disengage and interrupt the transmission of torque by being pushed to the right in FIG. 7 and separating from the clutch discs 39. The clutch plates 40 are connected to the hub 15 via the torsional damper 25.

With the structure shown in FIG. 7, the shape of one member that forms the damper housing 16, i.e., the lid 38, is a simple disc-shape, so the machining cost is able to be kept down accordingly. Also, machining of the lid 38 is able to be reduced, so distortion in the lid 38 as a result of machining the lid 38 is able to be inhibited, for example. The damper housing 16 is connected to the hub shaft 14 via this lid 38, so the rotational central axis of the damper housing 16 is able to be inhibited from inclining with respect to the rotational central axis of the crankshaft. Therefore, the rolling element 29 can be attached without being inclined, and is thus able to move in a reciprocating manner. Furthermore, the other member that forms the damper housing 16 is formed by the annular recessed portion 37 that has a rectangular cross-section, so a space is able to be formed between the annular recessed portion 37 and the hub shaft 14. Also, the annular recessed portion 37 protrudes toward the engine side, not shown, so the lockup clutch 36 and the torsional damper 25 are able to be arranged in this space. As a result, the axial length of the torque converter 1 is able to be shorter by effectively utilizing space. In this way, the torque converter 1 is also able to be made lighter by the amount that the axial length of the torque converter 1 is made shorter.

Figure 8:
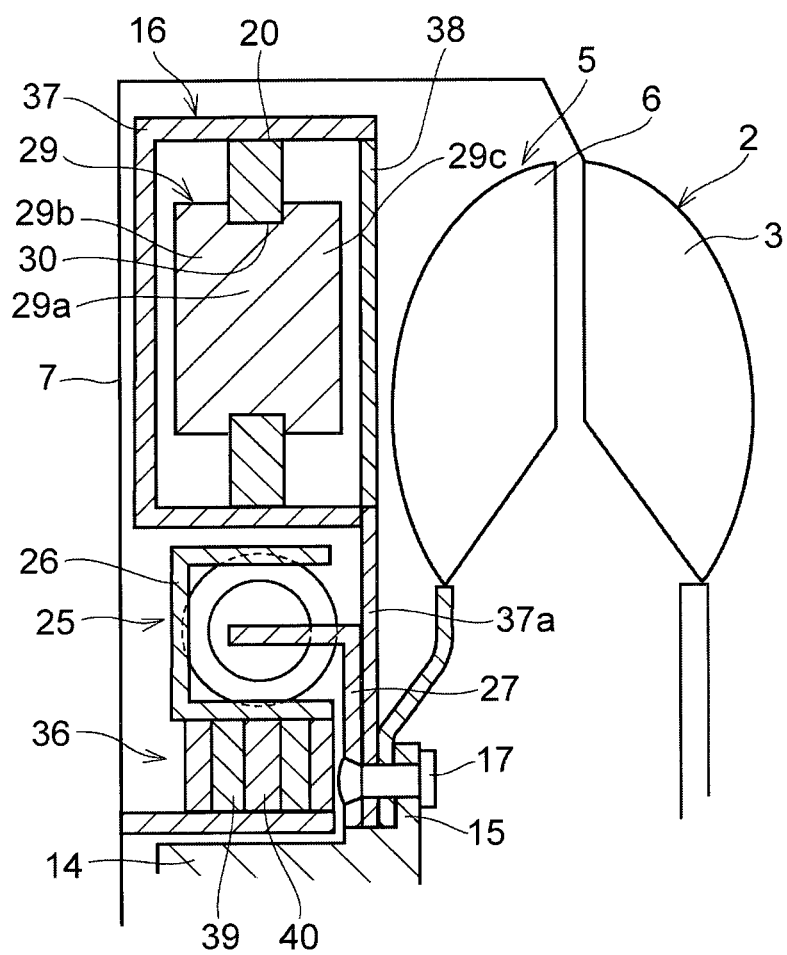
FIG. 8 is a sectional view of a first modified example in which a portion of the structure of the torsional vibration reduction device according to the fourth example embodiment shown in FIG. 7 has been modified.

FIG. 8 is a sectional view of a first modified example in which a portion of the structure of the torsional vibration reduction device according to the fourth example embodiment shown in FIG. 7 has been modified. In the first modified example illustrated here, the inner peripheral end portion of the annular recessed portion 37 is bent inward in the radial direction, and a tip end portion thereof extends inward in the radial direction. That is, a flange portion 37a is formed on the annular recessed portion 37, and this flange portion 37a is fastened to the hub 15 by the rivet 17. Also, the lid 38 is formed in an annular shape so as to fit together with the opening in the annular recessed portion 37. Also, the damper housing 16 is sealed maintaining the liquid-tight state, by the connecting points of these members 37 and 38 being welded together.

Figure 9:
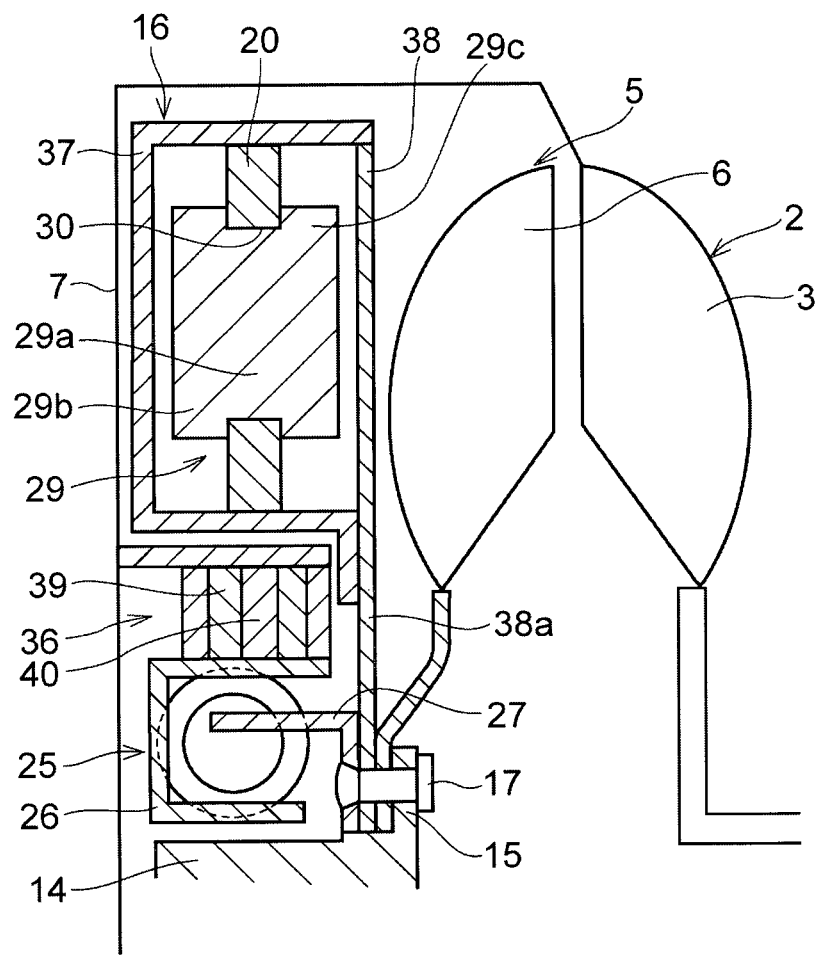
FIG. 9 is a sectional view of a second modified example in which a portion of the structure of the torsional vibration reduction device according to the fourth example embodiment of the invention has been modified.

FIG. 9 is a sectional view of a second modified example in which a portion of the structure of the torsional vibration reduction device according to the fourth example embodiment shown in FIG. 7 has been modified. In the second modified example illustrated here, the positions of the torsional damper 25 and the lockup clutch 36 in the radial direction of the damper housing 16 are switched compared to the structure shown in FIG. 7. That is, the lockup clutch 36 is arranged to the inside of the damper housing 16 in the radial direction, and the torsional damper 25 is arranged between this lockup clutch 36 and the hub shaft 14.

Figure 10:
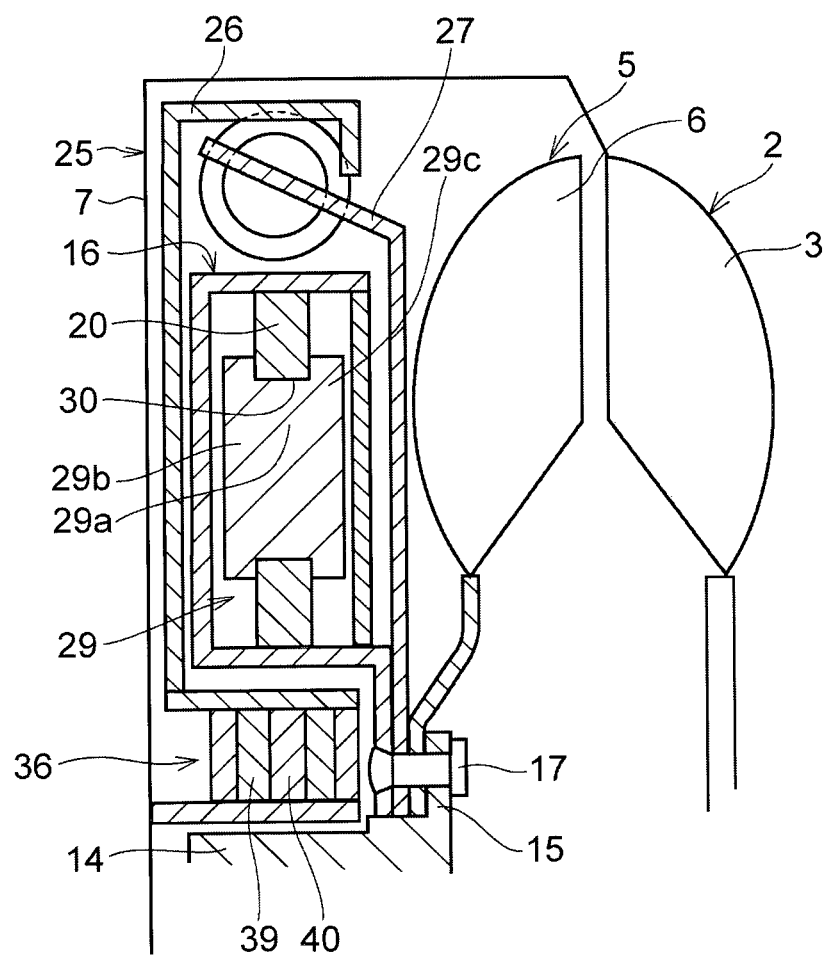
FIG. 10 is a sectional view of a third modified example in which a portion of the structure of the torsional vibration reduction device according to the fourth example embodiment of the invention has been modified.

FIG. 10 is a sectional view of a third modified example in which a portion of the structure of the torsional vibration reduction device according to the fourth example embodiment shown in FIG. 7 has been modified. In the third modified example illustrated here, the lockup clutch 36 is arranged between the damper housing 16 and the hub shaft 14. Also, the torsional damper 25 is arranged on the opposite side of the damper housing 16 than the lockup clutch 36, i.e., the torsional damper 25 is arranged between the front cover 7 and the damper housing 16. With all of the structures shown in FIGS. 8, 9, and 10, space is able to be effectively utilized. As a result, similar operation and effects as those obtained by the structure shown in FIG. 7 are able to be obtained.

What is claimed is:

1. A fluid power transmitting device that has a driving side member configured to generate a fluid flow and a driven side member driven by the fluid flow, the fluid power transmitting device comprising:
    a torsional vibration reduction device provided inside of the fluid power transmitting device, the torsional vibration reduction device further comprising:
        a rolling element configured to move in a reciprocating manner according to a variation in torque inputted in the rolling element;
        a retaining member that has a rolling chamber configured to house the rolling element in a manner that enables the rolling element to move in the reciprocating manner, wherein the retaining member has an annular shape and includes a cutout portion on an outer peripheral portion of the retaining member; and
        a housing being configured to shield the rolling element and the rolling chamber from fluid inside of the fluid power transmitting device, the housing including an annular recessed portion and a lid, the retaining member being sandwiched by the annular recessed portion and the lid such that the retaining member is fixed and enclosed inside of the housing, and at least one of the annular recessed portion and the lid includes a protruding portion that engages with the cutout portion.

2. The fluid power transmitting device according to claim 1, wherein
    the annular recessed portion has both an annular shape and a shape that is open to the driven side member side; the lid has a shape that covers an open end portion of the annular recessed portion; the fluid power transmitting device has an elastic damper inside the fluid power transmitting device; the elastic damper is configured to connect, in a manner that enables power to be transmitted, an input side plate and an output side plate via an elastic body, the input side plate and the output side plate being provided inside the fluid power transmitting device; and
    the housing and the elastic damper are arranged lined up in an axial direction of the housing.

3. The fluid power transmitting device according to claim 2, wherein
    at least one of the annular recessed portion and the lid is fixed to the driven side member.

4. The fluid power transmitting according to claim 2, wherein
    the fluid power transmitting device has a lockup clutch that connects the driving side member to the driven side member; and
    the housing, the elastic damper, and the lockup clutch are arranged lined up in the axial direction.

5. The fluid power transmitting device according to claim 1, wherein
    the annular recessed portion has both an annular shape and a shape that is open to the driven side member side; the lid has a shape that covers an open end portion of the annular recessed portion; and
    the fluid power transmitting device has an elastic damper inside the fluid power transmitting device; the elastic damper is configured to connect, in a manner that enables power to be transmitted, an input side plate and an output side plate that are provided inside the fluid power transmitting device, via an elastic body.

6. The fluid power transmitting device according to claim 5, wherein
    at least one of the annular recessed portion and the lid is fixed to the driven side member.

7. The fluid power transmitting device according to claim 5, wherein
    the fluid power transmitting device has a lockup clutch that connects the driving side member to the driven side member.

8. The fluid power transmitting device according to claim 1, wherein
    the retaining member has a plurality of the rolling chambers, the plurality of rolling chambers are provided bilaterally symmetrical with a straight line that passes through a center portion in a circumferential direction of the retaining member and follows a radial direction of the retaining member as an axis of symmetry.

9. The fluid power transmitting device according to claim 1, wherein
    the rolling element is configured to move in the reciprocating manner in a radial direction of the housing.

10. The fluid power transmitting device according to claim 1, wherein the housing is fastened to a hub by a rivet.

11. The fluid power transmitting device according to claim 1, wherein a turbine runner and a damper housing are integrally connected to the hub by a rivet.

12. The fluid power transmitting device according to claim 1, wherein the lid which is formed thinner in thickness than the retaining member is connected to a hub by a rivet.

* * * * *